Figure 1:
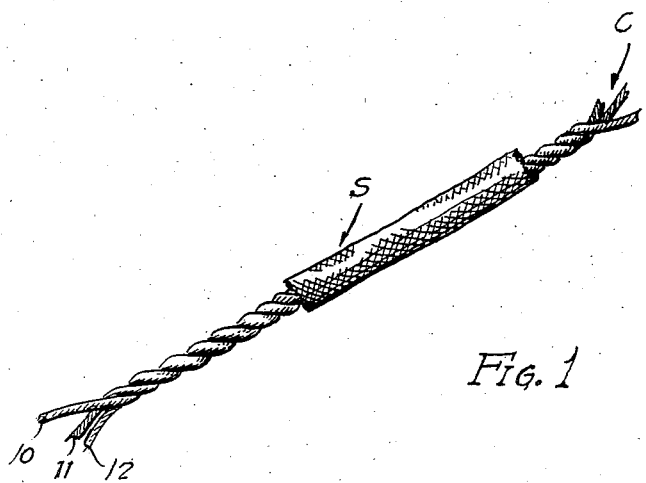

Aug. 17, 1943.  C. B. GUDEBROD  2,327,104
POWER TRANSMISSION BELT
Filed Sept. 19, 1941

INVENTOR.
CHARLES B. GUDEBROD
BY
ATTORNEY.

Patented Aug. 17, 1943

2,327,104

UNITED STATES PATENT OFFICE 2,327,104

POWER TRANSMISSION BELT

Charles B. Gudebrod, Wayne, Pa.

Application September 19, 1941, Serial No. 411,523

5 Claims. (Cl. 74—238)

This invention relates to power transmission belts and is concerned primarily with belts such as are included as essential elements of a dental engine or like device and which belt transmits power from a rotary power source to a drill or other rotary instrumentality.

In devices of the character aforesaid the pulleys over which the transmission belts operate are small in diameter and the grooves of such pulleys are small in cross-section. Thus, the belts must accommodate themselves to the repeated and radical flexings due to small diameter and must also fit the small groove of the pulley in order to obtain sufficient traction for power transmission. Efficiency of operation depends largely upon the factors of tautness of the belt and the frictional engagement between the belt and pulley. Good sustained service, of course, depends largely upon the property of tautness and flexibility of the belt to resist the strain of repeated flexing.

The undesirable quality of stretchability has been recognized heretofore and efforts have been made to overcome this objection. An example of such efforts is shown in Patent No. 862,403, issued on August 6, 1907 to Lahue. In one form of his invention Lahue employed a wire core to obtain freedom from stretchability and encased the core in a braided sheath in order to obtain traction between the belt and pulley or shaft.

With the foregoing practical requirements and prior effort to solve the problem in mind an object of this invention is the provision of a power transmission belt in which the undesirable property of stretchability has been substantially eliminated while flexibility and ability to afford proper frictional engagement with the pulleys have been maintained so as to provide long and satisfactory service.

In carrying out this object the invention proposes to follow the idea of employing a core of a non-stretching but relatively compressible character with a tight encasing sheath, preferably braided upon the core, of high-grade silk or similar material to afford traction, and protection for the core.

More in detail an object of the invention is the provision of a power transmission belt which includes a core made up of one or more strands of yarn which is formed from fibres of relatively non-stretchable fibres twisted into yarn formation. Yarn made from spun glass fibres is satisfactory for this purpose. The bearded character of the spun glass fibres, in combination with the use of a tight encasing sheath, effects a relatively non-stretchable belt which is highly flexible and adapted to afford a highly tractive surface when properly treated. A plurality of strands of yarn may be twisted together and similarly sheathed for heavier work when desired.

Various other more detailed objects and advantages of the invention will in part become apparent, and in part be hereinafter stated, as the description of the invention proceeds.

The invention, therefore, comprises a power transmission belt, or the like, consisting of a core of yarn made from tightly twisted glass fibres with an encasing sheath tightly encasing said core and being, preferably, made of high grade braided silk which is impregnated to impart waterproof and tractive properties thereto.

It can be seen readily that the core, while not extensible in character, will be relatively soft and deformable. These latter features will tend to decrease the strain on the braided sheath because the tendency of a hard and non-deformable core would be to cut the braid as the belt comes in contact with the pulley in its travel. The deformability is also important in increasing traction since the belt conforms to the shape of the pulley when it is in the groove.

For a full and more complete understanding of the invention reference may be had to the following description and accompanying drawing, wherein Figure 1 is a perspective view of a portion of a power transmission belt which has been made in accordance with the precepts of this invention. In this view parts of the sheath have been cut away to more clearly bring out the details of construction of the core.

Referring now to the drawing, wherein like reference characters denote corresponding parts it will be noted that the power transmission belt of this invention comprises a core referred to generally by the reference character C and a sheath designated S. The core C is made up of a plurality of strands of yarn. The number of strands employed may vary although the invention contemplates using at least two strands so that they may be wrapped about each other to provide a core that may be snugly encased in a cylindrical sheath. In the illustrated embodiment the core C is made up of three strands designated 10, 11 and 12. The strands 10, 11 and 12 are substantial duplicates and each is made up of spun glass fibres that are twisted together to form yarn. Strands 10, 11 and 12 are wrapped about each other in the manner depicted to provide a core, a cross-section of which is substantially circular.

The sheath S is preferably braided about the core C. This sheath S may be made from any appropriate textile although the invention has particularly in mind the use of a high grade silk. After braiding, the sheath S is impregnated with a compound which imparts waterproofing properties thereto and which also gives to the sheath the frictional character which enables it to engage the pulleys with a non-skid relation.

While a preferred specific embodiment of the invention is hereinbefore set forth it is to be clearly understood that the invention is not to be limited to the exact features illustrated and described, because various modifications of these details may be provided in putting the invention into practice within the purview of the appended claims.

I claim:

1. A power transmission belt of the character described comprising a core including a strand of yarn made from spun glass fibres twisted together, and a sheath encasing and grippingly engaging said core.

2. A power transmission belt of the character described comprising a core including a strand of yarn made from spun glass fibres twisted together, and a sheath of textile material braided tightly about said core and holding said fibres in twisted relation to maintain maximum strength of said core and belt.

3. A power transmission belt of the character described comprising a core including a plurality of strands of yarn wrapped about each other, each strand consisting of spun glass fibres twisted into yarn formation, and a sheath encasing said core.

4. A power transmission belt of the character described comprising a core including two strands of yarn wrapped about each other, each strand consisting of spun glass fibres twisted into yarn formation, and a sheath of textile material braided tightly about said core and holding said fibres in twisted relation to maintain maximum strength of said core and belt.

5. A power transmission belt of the character described comprising a core including a plurality of strands of yarn wrapped about each other, each strand consisting of spun glass fibres twisted into yarn formation, and a sheath of silk braided tightly about said core and impregnated with a compound imparting waterproof and non-skid properties thereto.

CHARLES B. GUDEBROD.